United States Patent [19]

Matsumoto

[11] Patent Number: 5,240,784
[45] Date of Patent: Aug. 31, 1993

[54] MAGNETOOPTICAL RECORDING MEDIUM

[75] Inventor: Hiroyuki Matsumoto, Tokyo, Japan
[73] Assignee: Nikon Corporation, Tokyo, Japan
[21] Appl. No.: 708,008
[22] Filed: May 24, 1991

Related U.S. Application Data

[63] Continuation of Ser. No. 555,353, Jul. 20, 1990, abandoned, which is a continuation of Ser. No. 484,803, Feb. 26, 1990, abandoned.

[30] Foreign Application Priority Data

Mar. 1, 1989 [JP] Japan .................................. 1-49646

[51] Int. Cl.⁵ .............................................. G11B 5/66
[52] U.S. Cl. ................................... 428/694; 360/135; 369/13; 428/900
[58] Field of Search ................. 428/694, 900; 360/131, 360/135; 365/122; 369/13, 14, 288; 430/945

[56] References Cited

U.S. PATENT DOCUMENTS

| 4,649,519 | 3/1987 | Sun et al. .............................. 365/122 |
| 4,753,853 | 6/1988 | Sato ....................................... 428/694 |
| 4,855,975 | 8/1989 | Akasaka et al. ..................... 369/13 |

FOREIGN PATENT DOCUMENTS

| 225141 | 10/1987 | European Pat. Off. . |
| 257530 | 2/1988 | European Pat. Off. . |
| 258978 | 9/1988 | European Pat. Off. . |

OTHER PUBLICATIONS

Kobayashi et al., "Magnetization Process of Exchange Coupled Ferrimagnetic Dougle Layered Films" Jap. J. of App. Phys., vol. 20 No. 11, Nov. 1981 pp. 2089-2095.

Primary Examiner—Paul J. Thibodeau
Assistant Examiner—R. Follett
Attorney, Agent, or Firm—Shapiro and Shapiro

[57] ABSTRACT

A multi-layer magnetooptical recording medium capable of overwriting with magnetic field modulation method, includes:

a first layer having perpendicular magnetic anisotropy and composed of a rare earth metal-transition metal alloy; and a second layer having perpendicular magnetic anisotropy and composed of a rare earth metal-transition metal alloy;

wherein the Curie point of the second layer is lower than that of the first layer;

the compensation temperature of the second layer is positioned between the room temperature and the Curie point thereof;

the compensation temperature of the first layer is lower than that of the second layer;

the product of saturation magnetic moment and coercivity of the first layer is smaller, at room temperature, than that of the second layer, and a certain relation exists, below the compensation temperature of the second layer, among the coercivities of the first and second layers, saturation magnetic moments of the first and second layers, thicknesses of the first and second layers, and exchange coupling force.

7 Claims, 3 Drawing Sheets

MAGNETOOPTICAL RECORDING MEDIUM

This is a continuation of application Ser. No. 555,353 filed Jul. 20, 1990, which is a continuation of application Ser. No. 484,803 filed Feb. 26, 1990, both of which are now abandoned.

BACKGROUND OF THE INVENTION

1. Field of the Invention

The present invention relates to a multi-layer magnetooptical recording medium capable of overwriting with magnetic field modulation method.

2. Related Background Art

Efforts are being recently made toward the development of an optical record/reproducing method satisfying various requirements including a high density, a high capacity, a high access speed and a high recording and reproducing speed, and a recording apparatus, a reproducing apparatus and a recording medium adapted for use in such method.

Among various optical record/reproducing methods, the magnetooptical method is most attractive due to its unique advantage of ability to erase the information after the recording and reproduction thereof and to repeat this process by any number of times.

The recording medium employed in said magnetooptical record/reproducing method is provided, as the recording layer, with a perpendicular magnetic layer or layers. Said layer is composed, for example, of amorphous GdFe, GdCo, GdFeCo, TbFe, TbCo or TbFeCo. The recording layer generally constitutes a concentric, spiral or linear track, on which information is recorded. In the present text, either of "upward" and "downward" directions with respect to the surface of the layer is defined as "direction A", and the other as "inverse direction A". The information to be recorded is binarized in advance, and recorded by a mark $B_1$ having magnetization of "direction A" and a mark $B_0$ having magnetization of "inverse direction A". Each mark represents a bit, and said marks $B_1$ and $B_0$ correspond to "1" and "0" of binary signal. Prior to the recording, the magnetization of the track for information recording is aligned to the state $B_0$ of "inverse direction A" by the application of a strong external magnetic field, and this process is called "initialization". Then the marks $B_1$ of the "inverse direction A" according to the information signal to be recorded. The information is recorded by the combination of binary marks $B_0$ and $B_1$.

Principle of Recording

The magnetization on the recording medium advantageously utilizes the spatial coherence of a laser beam, which can be concentrated to a small spot comparable to the diffraction limit determined by the wavelength of the laser beam. The concentrated beam irradiates the track surface, and the information is recorded by forming a mark with a diameter not exceeding 1 μm. The optical recording can theoretically achieve a recording density up to about $10^8$ bit/cm$^2$, since the laser beam can be concentrated to a spot of a diameter comparable to the wavelength.

FIG. 4 schematically shows the recording principle of magnetooptical recording method. In said method, a laser beam L is concentrated to heat a recording layer 1, and an external recording magnetic field Hb, opposite to the direction of initialization, is simultaneously applied to the heated portion. Thus the coercivity Hc of the heated portion decreases below said recording magnetic field Hb, whereby the magnetization of said portion is aligned with the recording field Hb. In this manner a mark $B_1$ of inverse magnetization is formed.

Ferromagnetic materials and ferrimagnetic materials show different temperature dependence of the magnetization M and the coercivity Hc. The ferromagnetic materials show a decrease in coercivity Hc in the vicinity of the Curie temperature, and the recording is based on this phenomenon. Such recording is therefore called Tc recording (Curie point recording).

The ferrimagnetic materials have a compensation temperature Tcomp, where the magnetization M is zero, lower than the Curie temperature. The coercivity Hc becomes very high in the vicinity of said compensation temperature, but decreases rapidly outside such temperature range. Thus reduced coercivity can be easily overcome even by a relatively weak recording magnetic field Hb, whereby the recording becomes possible. Such recording process is called Tcomp recording (compensation temperature recording).

However, it is not necessary to stick to the Curie temperature, vicinity thereof, or the vicinity of the compensation temperature. The recording is possible by applying, to a recording medium having a reduced coercivity Hc at a certain temperature higher than the room temperature, a recording field Hb capable of overcoming thus reduced coercive force Hc.

Principle of Reproduction

FIG. 5 schematically shows the principle of information reproduction based on magnetooptical effect. Light is an electromagnetic wave having usually diverging electromagnetic vectors in all directions on the planes perpendicular to the light path. When the light is converted into linearly polarized light Lp and falls on the recording layer 1, it is either reflected or transmitted by said layer 1, wherein the plane of polarization is rotated according to the direction of magnetization M. Such rotating phenomenon is called magnetic Kerr effect or magnetic Faraday effect.

If the plane of polarization of reflected light is rotated by an angle $\theta k$ by the magnetization of direction A, it is rotated by $-\theta k$ by the magnetization of inverse direction A. Thus, if the axis of an optical analyzer is set perpendicularly to a plane inclined by $-\theta k$, the light reflected from a mark $B_0$ magnetized in the inverse direction A cannot be transmitted by the analyzer. On the other hand, the light reflected by a mark $B_1$ magnetized in the direction A is transmitted, by a proportion $(\sin 2\theta k)^2$, and is captured by a detector (photoelectric converter means).

Consequently the mark $B_1$ of the direction A appears lighter than the mark $B_0$ of the inverse direction A, thus generating a stronger electrical signal. Since the electrical signals from said detector are modulated according to the recorded information, so that said information can be reproduced.

For re-using the already recorded medium, it is necessary to (i) initialize the medium again in an initializing apparatus, (ii) provide the recording apparatus with an erasing head similar to the recording head, or (iii) erase the recorded information, as a preliminary step, on a recording or erasing apparatus.

Consequently the magnetooptical recording method has been considered incapable of overwriting for recording new information regardless of presence or absence of already recorded information.

However, there are already known a magnetooptical recording method and a recording medium therefor, by magnetic field modulation method, in which the direction of the recording field Hb is selectively modulated at the recording thereby arbitrarily forming the mark $B_1$ or the mark $B_0$.

Nevertheless, in contrast to the overwriting with light modulation, the overwriting with magnetic field modulation requires continuous emission of the laser beam without modulation. Therefore, as the temperature gradient at the recording position is smaller than in the conventional pulsed laser emission, it is necessary (1) to increase the change in the coercive force Hc around the recording temperature in order to form a uniform mark $B_1$ or $B_0$ with a clear boundary, and (2) to prevent the inversion of magnetization of the mark at the zero recording field. In order to simultaneously satisfy the magnetic requirements (1) and (2), the recording layer of the medium has to have mutually close compensation temperature Tcomp and Curie temperature Tc.

In such recording layer, the magnetic properties are significantly influenced even by a slight change or unevenness in the composition, and a first drawback lies in a fact that the production yield of the recording medium is therefore extremely low.

Also in the magnetic field modulation method, there cannot be applied an excessively large recording field Hb, because high-speed modulation of a large magnetic field requires a large electromagnet, a large current, a large current converter etc., which inevitably lead to the bulkiness of the record/reproducing apparatus. For this reason, in addition to foregoing requirement (2), the recording layer has to be sufficiently magnetizable with a weak recording field (Hb=200 Oe or lower). A second drawback lies in a fact that the composition of the recording layer satisfying such mutually contradicting requirements (2) and (3) is difficult to achieve. In fact such composition has not been reported.

SUMMARY OF THE INVENTION

An object of the present invention is to provide a recording medium capable of overwriting by magnetic field modulation.

The present inventor has reached the present invention, based on a fact that a medium defined below can simultaneously solve the above-mentioned two drawbacks.

Thus the present invention provides a multi-layer magnetooptical recording medium capable of overwriting by magnetic field modulation method (cf. FIG. 1), wherein the recording layer is composed of two layers each of which shows perpendicular magnetic anisotropy and has an alloy composition RE-TM, and which satisfy the following relations:

$Tcomp_1 < Tcomp_2 < Tc_2 < Tc_1$;

$Ms_1 Hc_1 < Ms_2 Hc_2$ at room temperature $T_R$; and at temperature not exceeding $Tcomp_2$:

$$Hc_1 - \frac{\sigma_w}{2Ms_1 t_1} < Hc_2 - \frac{\sigma_w}{2Ms_2 t_2} \quad (1)$$

and $$Hc_1 + Hc_2 > \left| \frac{\sigma_w}{2Ms_1 t_1} - \frac{\sigma_w}{2Ms_2 t_2} \right| \quad (2)$$

wherein RE: rare earth metal;
TM: transition metal;
$Tcomp_1$: compensation temperature of 1st layer;
$Tcomp_2$: compensation temperature of 2nd layer;
$Tc_1$: Curie temperature of 1st layer;
$Tc_2$: Curie temperature of 2nd layer;
$T_R$: room temperature;
$Hc_1$: coercive force of 1st layer;
$Hc_2$: coercive force of 2nd layer;
$Ms_1$: saturation magnetic moment of 1st layer;
$Ms_2$: saturation magnetic moment of 2nd layer;
$t_1$: thickness of 1st layer;
$t_2$: thickness of 2nd layer; and
$\sigma_w$: exchange coupling force.

In the structure shown in FIG. 1, the 1st and 2nd layers may be laminated in the inverted order with respect to the substrate S.

In general, in a 2-layered perpendicular magnetic film composed of ferrimagnetic rare earth (RE)-transition metal (TM) alloys, the magnetic characteristics vary significantly by the film temperature T. Now let us assume a recording medium satisfying a relation:

$Tcomp_1 < Tcomp_2 < Tc_2 < Tc_1$, and consider the apparent coercivity Hc of the 2-layered film (2 layers inclusive) in each of the following three zones of the recording temperature T:

(1) $T < Tcomp_1$,
(2) $Tcomp_1 < T < Tcomp_2$,
(3) $Tcomp_2 < T < Tc_2$ (1) In case of $T < Tcomp_1$, the sub lattice magnetization of the rare earth metal is larger than that in each of the two layers. Consequently the marks in the 1st and 2nd layers are in a same direction (parallel type), wherein, in comparison with the coercivity $Hc_2$ of the 2nd layer involved in recording, the apparent coercivity Hc of the entire 2-layered film can be represented by:

$$Hc = \frac{Hc_1 Ms_1 t_1 + Hc_2 Ms_2 t_2}{Ms_1 t_1 + Ms_2 t_2}$$

in case of $$Hc_1 + \frac{\sigma_w}{2Ms_1 t_1} \geq Hc_2 - \frac{\sigma_w}{2Ms_2 t_2},$$

or $$Hc = Hc_2 - \frac{\sigma_w}{2Ms_2 t_2}$$

in case of $$Hc_1 + \frac{\sigma_w}{2Ms_1 t_1} < Hc_2 - \frac{\sigma_w}{2Ms_w t_2}.$$

Thus the apparent coercive force Hc of the entire 2-layered film is small in either case, and the initialization is therefore easy.

(2) In case of $Tcomp_1 < T < Tcomp_2$, the sub lattice magnetization of TM is larger than that of RE in the 1st layer, but, in the 2nd layer, the sub lattice magnetization of RE is larger than that of TM. Consequently the marks in the 1st and 2nd layers assume mutually opposite directions (antiparallel type), and the apparent coercivity Hc of the entire 2-layered film can be represented as:

$$Hc = Hc_2 + \frac{\sigma_w}{2Ms_2t_2}$$

only under the compensation temperature of the 2nd layer and only when following relations:

$$Hc_1 - \frac{\sigma_w}{2Ms_1t_1} < Hc_2 - \frac{\sigma_w}{2Ms_2t_2}$$

and $$Hc_1 + Hc_2 > \left| \frac{\sigma_w}{2Ms_1t_1} - \frac{\sigma_w}{2Ms_2t_2} \right|$$

are satisfied.

Therefore, said apparent coercivity Hc is larger than the coercivity $Hc_2$ of the 2nd layer by:

$$Hc - Hc_2 = \frac{\sigma_w}{2Ms_2t_2}.$$

(3) In case of $Tcomp_2 < T < Tc_2$, the 2-layered film becomes the parallel type as in the case (1), because both layers are rich in the transition metal. Thus, in a condition:

$$Hc_1 + \frac{\sigma_w}{2Ms_1t_1} \geq Hc_2 - \frac{\sigma_w}{2Ms_2t_2}$$

the apparent coercivity Hc of the entire 2-layered film can be represented as:

$$Hc = \frac{Hc_1Ms_1t_1 + Hc_2Ms_2t_2}{Ms_1t_1 + Ms_2t_2}$$

and is lower than the coercivity $Hc_2$ of the 2nd layer by:

$$Hc_2 - Hc = \frac{Ms_1t_1(Hc_2 - Hc_1)}{Ms_1t_1 + Ms_2t_2}.$$

Also in a condition:

$$Hc_1 + \frac{\sigma_w}{2Ms_1t_1} < Hc_2 - \frac{\sigma_w}{2Ms_2t_2},$$

the apparent coercivity of the entire 2-layered film is $$Hc_2 - Hc = \frac{\sigma_w}{2Ms_2t_2}$$

$$\left( \text{since: } Hc = Hc_2 - \frac{\sigma_w}{2Ms_2t_2} \right).$$

Consequently, the value Hc is low.

In summary, the apparent coercivity Hc is high in the case (2), but is low in the case (3). Therefore, the apparent coercivity Hc of the entire 2-layered film shows a significant change if the recording temperature is selected in the vicinity of the boundary between the temperature ranges of the conditions (2) and (3).

It will be understood, therefore, that the foregoing assumed conditions can satisfy the requirement (1) mentioned before.

Also the requirement (2) can be satisfied, because the floating magnetic field is small due to the presence of the compensation temperature $Tcomp_2$ in the 2nd layer.

Also according to the foregoing assumption, the Curie temperature of the 1st layer is selected higher than that of the 2nd layer ($Tc_2 < Tc_1$), so that, in the vicinity of the aforementioned recording temperature or of $Tc_2$, the 1st layer shows a large saturation magnetic moment $Ms_1$ though the 2nd layer has only a small saturation magnetic moment $Ms_2$. Consequently there is obtained a sensitive response to the recording magnetic field, and the recording can therefore be effectively achieved even with a weak magnetic field. It will be understood that the aforementioned requirement (3) can also be satisfied by the assumed condition.

Therefore, the aforementioned first drawback is solved by the requirements (1) and (2), and the second drawback is solved by the requirements (2) and (3).

In summary, the recording temperature is above the compensation temperature $Tcomp_2$ of the 2nd layer, preferably around ($\pm 30°$ C.) of the Curie point $Tc_2$ thereof.

In said 2-layered magnetooptical recording medium, if the 1st layer is composed of an alloy of the general formula:

$$Gd_x(Fe_{100-y}Co_y)_{100-x'}$$

there is preferred a composition with $x = 15$ to 27 atom. % and $y = 10$ to 50 atm. %.

Also if the 1st layer is composed of an alloy of the general formula:

$$Dy_x(Fe_{100-y}Co_y)_{100-x'}$$

there is preferred a composition with $x = 15$ to 27 atom. % and $y = 10$ to 50 atom. %.

Also if the 1st layer is composed of an alloy of the general formula:

$$(Gd_zDy_{100-z})_x(Fe_{100-y}Co_y)_{100-x'}$$

there is preferred a composition with $x = 15$ to 27 atom. %, $y = 10$ to 50 atom. % and $z = 0$ to 100 atom. %.

On the other hand, in said 2-layered magneto-optical recording medium, if the 2nd layer is composed of an alloy of the general formula:

$$Tb_x(Fe_{100-y}Co_y)_{100-x'}$$

there is preferred a composition with $x = 18$ to 30 atom. % and $y = 2$ to 20 atom. %.

Also if the 2nd layer is composed of an alloy of the general formula:

$$(Tb_zDy_{100-z})_x(Fe_{100-y}Co_y)_{100-x'}$$

there is preferred a composition with $x = 18$ to 30 atom. %, $y = 3$ to 35 atom. % and $z = 0$ to 100 atom. %.

Also if the 2nd layer is composed of an alloy of the general formula:

$$(Gd_zTb_{100-z})_x(Fe_{100-y}Co_y)_{100-x'}$$

there is preferred a composition with x=18 to 30 atom. %, y=0 to 30 atom. % and z=0 to 50 atom. %.

DESCRIPTION OF THE PREFERRED EMBODIMENTS

Embodiment 1

A disk-shaped glass substrate of a thickness of 1.2 mm and a diameter of 130 mm was set in the vacuum chamber of a two-target RF magnetron sputtering apparatus.

The vacuum chamber was once evacuated to $5 \times 10^{-5}$ Pa, then argon gas was introduced with a pressure of $2 \times 10^{-1}$ Pa, and sputtering was conducted with a film forming speed of ca. 3 Å/sec.

At first a GdFeCo alloy was employed as the target to form, on the substrate, a 1st layer of a thickness $t_1 = 350$ Å, consisting of a perpendicular magnetic film of $Gd_{23}Fe_{58}Co_{19}$.

Then, while the same vacuum state is maintained, a TbDyFeCo alloy was employed as the target to form, on said 1st layer, a 2nd layer of a thickness $t_2 = 500$ Å, consisting of a perpendicular magnetic film of $Tb_{18}Dy_8$-$Fe_{64}Co_{10}$. The 2-layered magnetooptical recording medium is thus completed.

The magnetic characteristics of said recording medium are summarized in Tab. 1.

TABLE 1

|  | 1st layer | 2nd layer |
|---|---|---|
| Composition | $Gd_{23}Fe_{58}Co_{19}$ | $Tb_{18}Dy_8Fe_{64}Co_{10}$ |
| t | 350Å | 500Å |
| Ms | 100 emu/cc | 120 emu/cc |
| Hc | 150 Oe | 4700 Oe |
| Tc | 430° C. | 200° C. |
| Tcomp | 90° C. | 140° C. |
| $\sigma_w$ | | 1.9 erg/cm² |

Both layers of this medium are rich in the rare earth metal, and satisfy the following condition at room temperature:

$Tcomp_1 < Tcomp_2 < Tc_2 < Tc_1$.

In said medium, at room temperature:

$$A_1 = Hc_1 - \frac{\sigma_w}{2Ms_1t_1} \simeq -2,560$$

$$A_2 = Hc_2 - \frac{\sigma_w}{2Ms_2t_2} \simeq 3,100$$

so that $A_1 < A_2$. Also:

$$B_1 = Hc_1 + Hc_2 \simeq 4,850$$

$$B_2 = \left| \frac{\sigma_w}{2Ms_1t_1} - \frac{\sigma_w}{2Ms_2t_2} \right| \simeq 1,130$$

so that $B_1 > B_2$.

Consequently the requirements (1) and (2) are both satisfied.

Also, since:

$$Hc_1 + \frac{\sigma_w}{2Ms_1t_1} < Hc_2 - \frac{\sigma_w}{2Ms_2t_2}$$

the apparent coercivity Hc of this medium at room temperature is:

$$Hc = Hc_2 - \frac{\sigma_w}{2Ms_2t_2} = 3,100.$$

Figure 1:
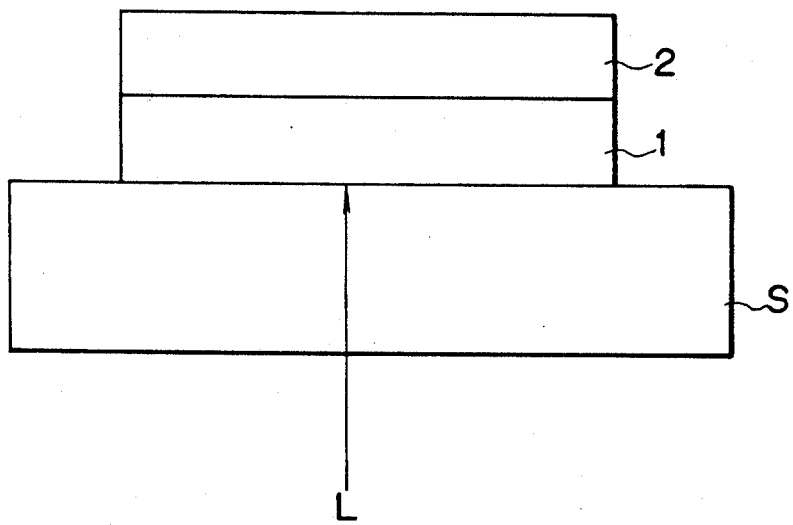
FIG. 1 is a schematic vertical cross-sectional view of a multi-layer magnetooptical recording medium of the present invention, capable of overwriting by magnetic field modulation.
Figure 2:
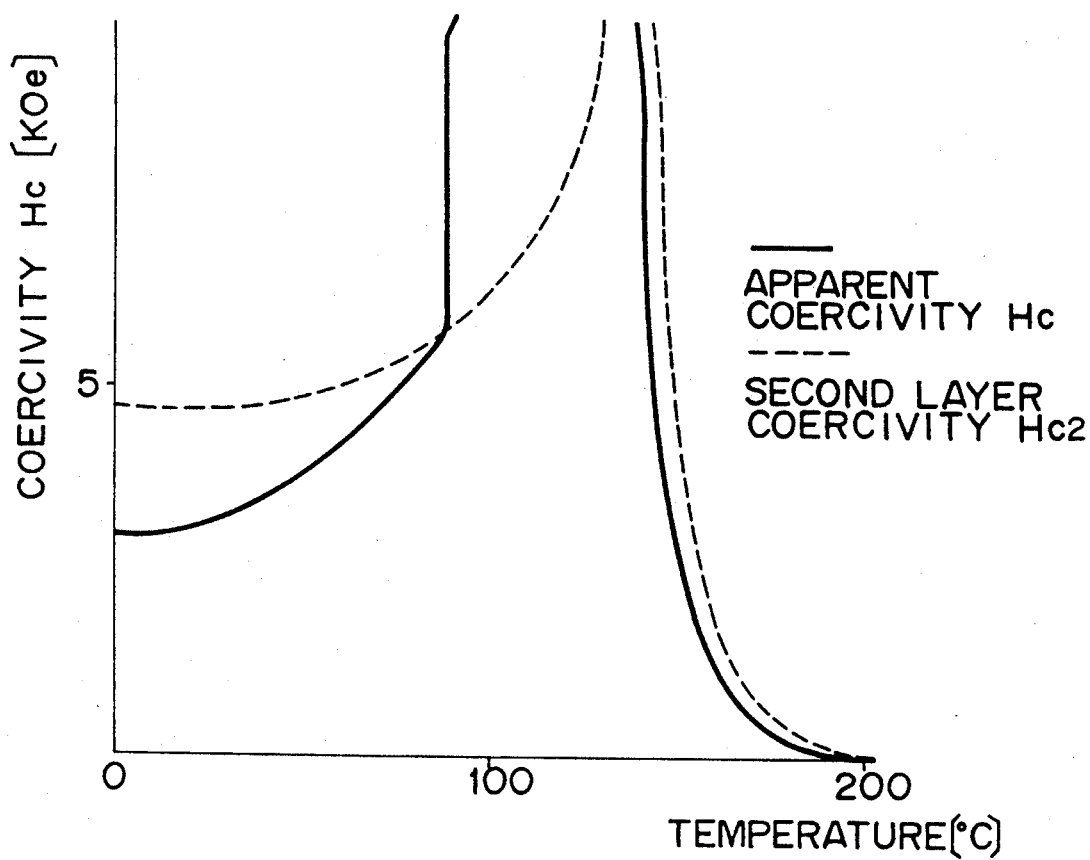
FIG. 2 is a chart showing the apparent coercivity Hc of the recording medium of the embodiment 1 of the present invention, as a function of temperature T, wherein the solid line indicates said apparent coercivity while the broken line indicates the coercivity of the second layer alone for comparison.

FIG. 2 shows the temperature dependence of the coercivity Hc of the recording medium prepared in the embodiment 1, together with that of the coercivity $Hc_2$ of the second layer (TbDyFeCo) only, for the purpose of comparison. Thus the temperature dependence of the coercivity Hc is improved by the use of two-layered structure.

Figure 3:
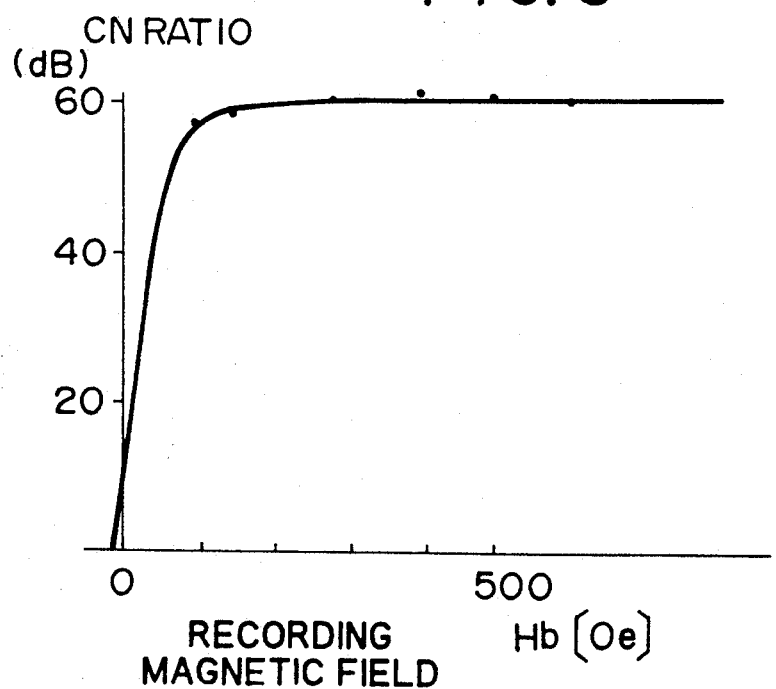
FIG. 3 is a chart showing the dependence of C/N ratio on the recording field Hb, in the recording medium of said embodiment 1 of the present invention.
Figure 4:
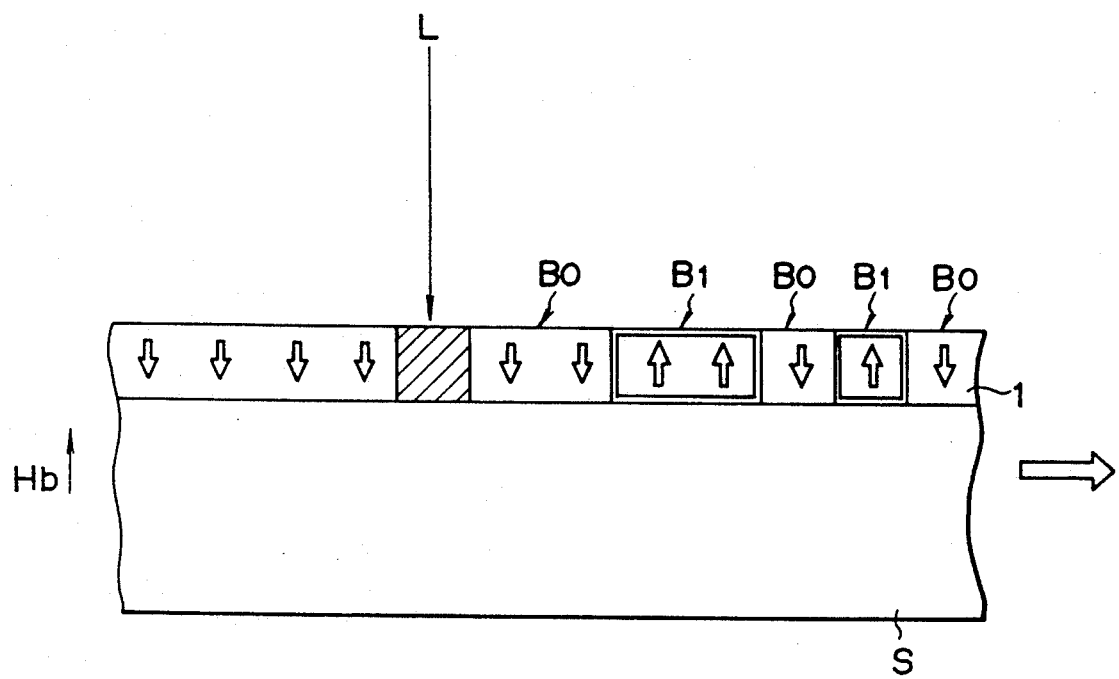
FIG. 4 is a schematic view showing the principle of recording in the magnetooptical recording method.
Figure 5:
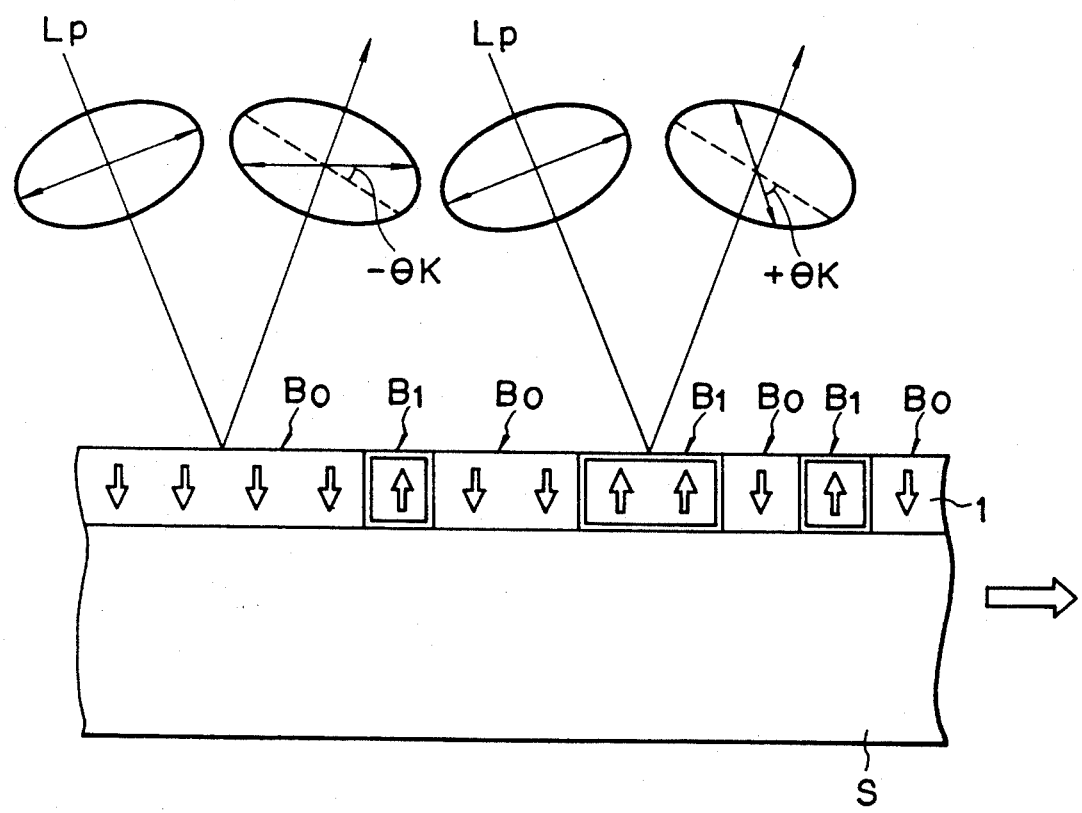
FIG. 5 is a schematic view showing the principle of reproduction in the magnetooptical recording method.

FIG. 3 shows the dependence of C/N ratio on the recording field Hb, when the disk of the embodiment 1 is subjected to information recording. As shown in this chart, the C/N ratio rises rapidly from a point where the recording field Hb is almost zero, indicating that the recording medium is adapted for use in overwriting with magnetic field modulation.

Embodiment 2

A disk-shaped glass substrate of a thickness of 1.2 mm and a diameter of 120 mm was set in the vacuum chamber of a two-Target RF magnetron sputtering apparatus.

The vacuum chamber was evacuated to a pressure of $5 \times 10^{-5}$ Pa, then argon gas was introduced and maintained at a pressure of $2 \times 10^{-1}$ Pa, and sputtering was conducted with a film forming speed of ca. 3 Å/sec.

At first a DyFeCo alloy was employed as the target to form, on said substrate, a first layer of a thickness $t_1 = 500$ Å, consisting of a perpendicular magnetic film of $Dy_{22.5}Fe_{49}Co_{28.5}$.

Then, while the same vacuum condition is maintained, a TbFeCo alloy was employed as the target to form, on said first layer, a second layer of a thickness $t_2 = 500$ Å, consisting of a perpendicular magnetic film of $Tb_{24}Fe_{70}Co_6$.

The 2-layered magnetooptical recording medium is thus completed.

The magnetic properties of said medium at room temperature are summarized in Tab. 2.

TABLE 2

|  | 1st layer | 2nd layer |
|---|---|---|
| Composition | $Dy_{22.5}Fe_{49}Co_{28.5}$ | $Tb_{24}Fe_{70}Co_6$ |
| t | 500Å | 500Å |
| Ms | 25 emu/cc | 100 emu/cc |
| Hc | 8000 Oe | 4000 Oe |
| Tc | 350° C. | 195° C. |
| Tcomp | 35° C. | 130° C. |
| $\sigma_w$ | | 3.2 erg/cm² |

This medium has a composition rich in the rare earth in both layers, and satisfies the relation:

Tcomp$_1$<Tcomp$_2$<Tc$_2$<Tc$_1$.

Embodiment 3

A disk-shaped glass substrate of a thickness of 1.2 mm and a diameter of 120 mm was set in the vacuum chamber of a two-target RF magnetron sputtering apparatus. The vacuum chamber was once evacuated to a pressure of $5\times10^{-5}$ Pa, then argon gas was introduced with a pressure of $2\times10^{-1}$ Pa, and sputtering was conducted with a film forming speed of ca. 3 Å/sec.

At first a GdDyFeCo alloy was selected as the target to form, on the substrate, a first layer of a thickness $t_1=350$ Å, consisting of a perpendicular magnetic film of $Gd_{12}Dy_9Fe_{55}Co_{24}$.

Then, while the same vacuum condition is maintained, a GdDyFeCo alloy was selected as the target to form, on said first layer, a second layer of a thickness $t_2=500$ Å, consisting of a perpendicular magnetic film of $Gd_{10}Dy_{15}Fe_{72}Co_3$. The 2-layered magnetooptical recording medium is thus completed.

The magnetic properties of said medium at room temperature are summarized in Tab. 3.

TABLE 3

|  | 1st layer | 2nd layer |
|---|---|---|
| Composition | Gd$_{12}$Dy$_9$Fe$_{55}$Co$_{24}$ | Gd$_{10}$Dy$_{15}$Fe$_{72}$Co$_3$ |
| t | 350Å | 500Å |
| Ms | 100 emu/cc | 130 emu/cc |
| Hc | 750 Oe | 2400 Oe |
| Tc | 380° C. | 200° C. |
| Tcomp | −10° C. | 150° C. |
| $\sigma_w$ | 2.1 erg/cm$^2$ | |

In this medium the 1st layer is rich in the transition metal while the 2nd layer is rich in the rare earth, and following relation is satisfied:

Tcomp$_1$<Tcomp$_2$<Tc$_2$<Tc$_1$.

As explained in the foregoing, the present invention provides a recording medium adapted for use in overwriting with the magnetic field modulation method. Also since the 1st layer is composed of a material with a high Curie temperature Tc$_1$ such as GdFeCo, the Kerr rotation angle is increased to improve the C/N ratio at the signal reproduction.

I claim:

1. A multi-layer magnetooptical recording medium capable of overwriting with the magnetic field modulation method, comprising:

a first layer having perpendicular magnetic anisotropy and composed of a rare earth metal-transition metal alloy; and a second layer having perpendicular magnetic anisotropy and composed of a rare earth metal-transition metal alloy;

wherein the composition temperature of said second layer is between room temperature $T_R$ and the Curie temperature of said second layer and wherein the following relations are satisfied:

Tcomp$_1$<Tcomp$_2$<Tc$_2$<Tc$_1$;

Ms$_1$Hc$_1$<Ms$_2$Hc$_2$ at room temperature $T_R$; and at temperature not exceeding Tcomp$_2$:

$$Hc_1 - \frac{\sigma_w}{2Ms_1t_1} < Hc_2 - \frac{\sigma_w}{2Ms_2t_2} \quad (1)$$

and $$Hc_1 + Hc_2 > \left| \frac{\sigma_w}{2Ms_1t_1} - \frac{\sigma_w}{2Ms_2t_2} \right| \quad (2)$$

wherein Tcomp$_1$: compensation temperature of 1st layer;

Tcomp$_2$: compensation temperature of 2nd layer;
Tc$_1$: Curie temperature of 1st layer;
Tc$_2$: Curie temperature of 2nd layer;
Hc$_1$: coercive force of 1st layer;
Hc$_2$: coercive force of 2nd layer;
Ms$_1$: saturation magnetic moment of 1st layer;
Ms$_2$: saturation magnetic moment of 2nd layer;
t$_1$: thickness of 1st layer;
t$_2$: thickness of 2nd layer; and
$\sigma_w$: exchange coupling force.

2. A magnetooptical recording medium according to claim 1, wherein said first layer is composed of an alloy of following general formula:

$Gd_x(Fe_{100-y}Co_y)_{100-x}$ wherein x=15 to 27 atom. % and y=10 to 50 atom %.

3. A magnetooptical recording medium according to claim 1, wherein said first layer is composed of an alloy of following general formula:

$Dy_x(Fe_{100-y}Co_y)_{100-x}$ wherein x=15 to 27 atom. % and y=10 to 50 atom %.

4. A magnetooptical recording medium according to claim 1, wherein said first layer is composed of an alloy of following general formula:

$(Gd_zDy_{100-z})_x(Fe_{100-y}Co_y)_{100-x}$ wherein x=15 to 27 atom. %, y=10 to 50 atom. % and z=0 to 100 atom %.

5. A magnetooptical recording medium according to claim 1, wherein said second layer is composed of an alloy of following general formula:

$Tb_x(Fe_{100-y}Co_y)_{100-x}$ wherein x=18 to 30 atom. % and y=2 to 20 atom %.

6. A magnetooptical recording medium according to claim 1, wherein said second layer is composed of an alloy of following general formula:

$(Tb_zDy_{100-z})_x(Fe_{100-y}Co_y)_{100-x}$ wherein x=18 to 30 atom. %, y=3 to 35 atom. % and z=0 to 100 atom %.

7. A magnetooptical recording medium according to claim 1, wherein said second layer is composed of an alloy of following general formula:

$(Gd_zTb_{100-z})_x(Fe_{100-y}Co_y)_{100-x}$ wherein x=18 to 30 atom. %, y=0 to 30 atom. % and z=0 to 50 atom %.

* * * * *